United States Patent Office 3,116,158
Patented Dec. 31, 1963

3,116,158
THERMAL INSULATING MATERIALS AND METHOD OF MAKING
William C. Taylor, Toledo, Ohio, assignor to Owens-Corning Fiberglas Corporation, a corporation of Delaware
No Drawing. Filed Aug. 26, 1959, Ser. No. 836,089
11 Claims. (Cl. 106—120)

This invention relates to new and improved synthetic thermal insulating materials and their preparation. More specifically, this invention relates to improved synthetic hydrous calcium silicate thermal insulating materials in which the hydrous calcium silicate has either a tobermorite crystalline structure, a xonotlite crystalline structure or a crystalline structure which is comprised of a mixture of tobermorite and xonotlite crystals.

The preparation of the insulating materials with which this invention is concerned is set forth in United States Patents 2,547,127 and 2,665,996, both of which patents are owned by the assignee of the present invention. United States Patent 2,547,127 discloses the preparation of porous insulating materials comprised of hydrous calcium silicate crystals of the formula $5CaO \cdot 5SiO_2 \cdot H_2O$ and United States Patent 2,665,996 discloses the preparation of porous insulating materials comprised of hydrous calcium silicate crystals of the formula $4CaO \cdot 5SiO_2 \cdot 5H_2O$ and porous insulating materials comprised of mixtures of hydrous calcium silicate crystals of the formula $5CaO \cdot 5SiO_2 \cdot H_2O$ and $4CaO \cdot 5SiO_2 \cdot 5H_2O$.

The above described hydrous calcium silicate insulating materials are prepared by the induration of aqueous lime-silica slurries in which the molar ratio of lime to silica generally falls within the range of from about 4:5 to 5:5. The amount of water in the slurry is preferably within the range of about 7.0 to 0.75 times the aggregate weight of the solids.

These slurries are subjected to a predetermined indurating temperature and pressure in excess of 173° C. and 125 p.s.i., respectively, thereby causing a reaction by which the lime, silica and water are converted completely into an integrated porous matrix structure of pure crystals which, depending on the ratio of lime to silica, may be microcrystalline lath crystals of xonotlite having the formula $5CaO \cdot 5SiO_2 \cdot H_2O$ or microcrystalline platy crystals of tobermorite having the formula $4CaO \cdot 5SiO_2 \cdot 5H_2O$ or mixtures of the two. When the molar ratio of lime to silica is about 4:5, the resultant crystalline structure is tobermorite; when the molar ratio of lime to silica is 5:5, the resultant integrated product has a xonotlite crystalline structure; and when the molar ratio of lime to silica is within the range of at least 4:5 to less than 5:5, the product is comprised of a mixture of xonotlite and tobermorite crystals.

In addition to the lime and silica reactants, fibrous asbestos is added to the water slurries. The asbestos, in finely divided or spiculated form, is added for primarily two reasons. It is an effective suspending agent and acts to support the solids in the dilute slurries during the reaction period and additionally provides reinforcement in the integrated product, tending to prevent cracking from occurring and acting to hold the pieces of finished insulating ware together after cracking, a function commonly referred to as hinging. Generally, a blend of chrysotile and amosite asbestos fibers are used although other types might be used equally as well. At present the chrysotile and amosite forms of fibrous asbestos are most readily available commercially. The asbestos is generally present to the extent of up to 20% by weight of the total solids in the slurries depending on the desired density of the end product. The higher percentages of asbestos, because of its suspending power, are especially necessary in the lower density products which in turn are prepared from the more dilute slurries.

In addition to the lime, silica and asbestos ingredients, small amounts of finely divided inorganic materials, usually between about 5 and 25% by weight of the total solids, which materials are inert to the lime-silica reactants and which are insoluble in the slurry and therefore capable of retaining their particulate form in the water slurries, are added along with the solids. They have proven to be beneficial to the final insulating product insofar as their use has resulted in increased thermal efficiency as expressed in terms of its "K-factor." These materials are ground to a size not greater than 74 microns and are uniformly dispersed throughout the final product.

The primary object of this invention is to provide an improved hydrous calcium silicate insulating material. Another object of this invention is to provide a synthetic calcium-silicate insulating material comprised of integrated crystals of tobermorite having an improved modulus of rupture, greater hinging strength and better shrinkage characteristics at elevated temperatures.

Still another object of this invention is to provide hydrous calcium silicate insulating materials which are more resistant to temperatures of the order of about 1800° F. or more, said materials exhibiting less shrinkage and better strength retention at these excessively high temperatures.

A still further object of this invention is to provide a method for producing such improved ware and it is an ancillary object to provide a slurry having better pouring characteristics than those presently used in the production of hydrous calcium silicate insulating materials.

These and other objects will become more evident as the description proceeds.

The objects of this invention have been accomplished by incorporating a fibrous grade of wollastonite along with the other batch constituents used in forming the thermal insulating materials. More specifically, improved thermal insulating ware may be provided by incorporating, along with the solids and water used in forming the reactive slurries, a coarse grade of wollastonite, having a needle-like, fibrous crystalline form wherein the particle size of the fibrous wollastonite has approximately the following size distribution range:

| Percent passing indicated screen— | Percent |
|---|---|
| 20 mesh | 78 |
| 35 mesh | 47 |
| 45 mesh | 30 |
| 70 mesh | 15 |
| 100 mesh | 8 |
| 200 mesh | 2 |
| 325 mesh | 0 |

The strength of hydrous calcium silicate bodies depends upon the cohesion of the calcium silicate crystals and upon the adhesion of these crystals to other materials that may be incorporated in the mass as reinforcing agents. A combination of high cohesive and high adhesive qualities makes for high strength. Cohesion is a specific property of each crystalline material and the ultimate strength of any crystalline mass is limited by that particular crystal material. Adhesion depends upon the chemical nature of the bodies in contact. For instance, the adhesion of gypsum plaster to quartz sand is very low, but that of most hydrous calcium silicates to sand is high. The high adhesion of hydrous calcium silicate crystals to asbestos fibers has been long recognized, as has the low adhesion to organic fibers.

The present inventor has discovered that a very high adhesive bond exists between hydrous calcium silicate crystals and fibers of crystalline wollastonite, a stable anhydrous calcium silicate.

The extent of the area of surface contact determines the degree to which adhesion exerts its influence. Thus, other things being equal, an elongated crystal will present a greater surface area per unit mass than a cubic crystal, and the total force of adhesion will be much greater. In the present invention, needle-like fibers of crystalline wollastonite are employed to take advantage of this fact.

Generally speaking, the coarse, fibrous, needle-like crystals which are utilized in the practice of this invention are of such a size that less than about 10% of the crystals will pass through a 100 mesh screen. The wollastonite is a natural anhydrous mono-calcium silicate, $CaO \cdot SiO_2$, the crystals of which are up to ¼ inch in length with an average length to thickness of about 8 to 1.

In order to more clearly illustrate the concepts of this invention, the preparation of representative thermal insulating materials in accordance therewith is illustrated by the following examples:

*Example 1*

A calcium silicate insulating material having a matrix of a tobermorite crystalline structure was prepared by initially forming a slurry having a water to solids ratio of 5.53 and a molar ratio of CaO to $SiO_2$ of approximately 0.8. The resultant slurry was then indurated in an atmosphere of superheated steam for a period of 6½ hours at a pressure of 225 p.s.i. and at a temperature of 190° C. The solids in the slurry had the following composition:

| Ingredient— | Percent by weight of total solids |
|---|---|
| Fibrous asbestos | 19.7 |
| Quicklime (CaO/quicklime=.94) | 27.5 |
| Tripoli ($SiO_2$/tripoli=.99) | 11.5 |
| Diatomaceous earth ($SiO_2$/diatomaceous=.815) | 27.0 |
| Kaolin ($SiO_2$/kaolin=.457) | 3.2 |
| Ground limestone | 7.9 |
| Iron chromite $Fe(CrO_2)_2$ | 3.2 |

Both the ground limestone and the iron chromite were comprised of finely ground particles having a particle size of less than 74 microns. Their incorporation along with the other batch ingredients resulted in improved thermal efficiency in the finished product. One hundred percent of the particles of these two ingredients passed a 200 mesh screen while 99.7% passed a 325 mesh screen. The particles of these materials were inert to the lime-silica reactants and were non-reactive with the water present in the slurry. They were evenly distributed throughout the indurated ware.

The diatomaceous earth had the following analysis:

| Ingredient— | Percent by weight |
|---|---|
| Silica | 81.53 |
| Alumina | 3.43 |
| Ferric oxide | 3.34 |
| Lime | 2.61 |
| Potash | 1.16 |
| Soda | 1.43 |
| Ignition loss | 6.04 |

The kaolin had the following analysis:

| Ingredient— | Percent by weight |
|---|---|
| Silica | 45.74 |
| Alumina | 38.47 |
| Iron oxides | 0.53 |
| Titania | 1.07 |
| Trace oxides | 0.42 |
| Ignition loss | 13.69 |

*Example 2*

A second hydrous calcium silicate type of porous insulating material comprised of integrated matrix crystals of tobermorite was prepared in accordance with Example 1 except that 3.28%, based upon the weight of the total solids, of fibrous wollastonite crystals having a size distribution range as set forth above was substituted for an equivalent amount of the fibrous asbestos.

Ware produced in accordance with Examples 1 and 2 were tested to determine the modulous of rupture, the percent strength remaining after break (hinging) and the percent shrinkage at 1200° F. The results of these tests are reported in Table 1 below.

TABLE 1

| Properties | Example 1 | Example 2 | Size of Piece (Pipe Insulation) | |
|---|---|---|---|---|
| | | | Inside diameter, inches | Thickness, inches |
| Modulus of rupture | 82.4 | 84.6 | 2 | 1 |
| Do | 68.6 | 76.5 | 3 | 1 |
| Percent of strength remaining after break (hinging) [1] | 68.6 | 70.6 | 2 | 1 |
| Do | 68.6 | 75.7 | 3 | 1 |
| Percent of shrinkage at 1,200° F | 1.16 | 1.13 | | |

[1] Measured on center point loading after crack appears.

The incidence of air holes in the thermal insulating ware produced with a given slurry is dependent upon the consistency of the slurry. The quality of the ware produced using the slurry of Example 1 was subject to a rate of rejection of 1 piece in 67 pieces for this reason whereas a reduction of 56% in this rejection rate was realized using the slurry of Example 2. The substitution of fibers of wollastonite for part of the asbestos results in a "thinner" slurry with much improved handling and/or pouring characteristics.

In preparing tobermorite types of calcium silicate insulating materials up to 5% by weight of the total solids, of wollastonite fibers may be utilized where the water to solids ratio is approximately six. In preparing the slurry, wollastonite fibers are generally substituted directly for an equivalent amount of asbestos. More than 5% by weight of wollastonite substituted for the asbestos in the dilute slurries results in slurries more prone to settle and segregate and consequently results in a poorer quality tobermorite thermal insulating product.

As the water to solids ratio is reduced in forming more dense tobermorite products, a greater percentage of wollastonite fibers may be substituted for asbestos, i.e., at a water to solids ratio of 3, up to about 12% wollastonite may be used with resultant increases in strength and a reduction of shrinkage in the indurated product. In producing tobermorite calcium silicates the suspending function of the asbestos is quite critical and sufficient finely divided or spiculated asbestos must be present in the slurry to support the solids in suspension prior to their reaction. Wollastonite does not have the degree of suspending power evidenced by the asbestos and therefore can only be utilized to a limited extent.

The following table sets forth the optimum ranges for asbestos and wollastonite in tobermorite bodies prepared from slurries having varied water/solids ratios. The wollastonite plus the asbestos should not exceed 20% by weight of the total solids.

TABLE 2

| Water/Solids Ratio | Asbestos [1] | Wollastonite [1] |
|---|---|---|
| 3 | 8–10 | 10–12 |
| 6 | 15–17 | 3–5 |

[1] Percent by weight of total solids.

The following examples illustrate the incorporation of wollastonite in xonotlite calcium silicate thermal insulating materials.

Example 3

The following ingredients were added to 3600 pounds of water to form a slurry having a water to solids ratio of about one.

| Ingredient | Weighed Amount (Pounds) | Percent by Weight Total Solids |
|---|---|---|
| Chrysotile Asbestos | 550 | 14.83 |
| Hydrated Lime | 1,880 | 39.06 |
| Red Iron Oxide | 15 | 0.40 |
| Tripoli | 1,520 | 40.99 |
| Pigment Grade Wollastonite | 175 | 4.72 |

The molar ratio of $CaO/SiO_2$ was .977. The following factors applied to the tripoli and lime used.

$$CaO/\text{hydrated lime} = .73$$
$$SiO_2/\text{tripoli} = .99$$

The wollastonite added to the slurry in this example was of a pigment grade and 100% passed a 200 mesh screen, 99.7% passing a 375 mesh screen. The red iron was added for color.

Example 4

In Example 4, all of the chrysotile asbestos in Example 3 was replaced by 550 pounds of a coarse grade wollastonite, the remaining ingredients in the slurry remaining unchanged.

The slurries of Examples 3 and 4 were indurated for a period of 6½ hours at 225 p.s.i. and at a temperature of 190° C. The resultant products all had essentially a matrix of a xonotlite crystalline structure, the asbestos fibers, inert ingredients and fibrous wollastonite being dispersed at random throughout the hydrous calcium silicate crystalline matrix.

Test data on the thermal insulating ware produced with the slurry of Example 3, where asbestos provided the sole reinforcement, showed shrinkages in the ware of from 1.75 to 2.0 percent, and losses in strength of from 80 to 90 percent when the ware was heated at 1800° F. for 24 hours. The ware produced from the slurry of Example 4 showed a reduction in shrinkage to 0.6 to 1.0 percent and a retention in strength of approximately 60% when subjected to a temperature of 1800° F. for 24 hours.

Example 5

A high density xonotlite material was prepared in accordance with the method set forth above except that the resultant thermal insulating body was comprised of 50% by weight of wollastonite and 50% by weight of xonotlite.

The slurry was initially prepared by adding 1880 pounds of hydrated lime ($CaO/\text{hydrated lime}=0.73$), 1520 pounds of tripoli ($SiO_2/\text{tripoli}=0.99$) and 3008 pounds of the coarse grade fibrous wollastonite to water of 6000 pounds of water ($CaO/SiO_2=.977$). The resultant indurated ware had the following physical properties:

Density _____ 50 pounds per cubic foot.
Modulus of rupture _____ 390 p.s.i.
Modulus of rupture, after heating at 1800° F. for 24 hours __ 220 p.s.i.
Shrinkage, after heating at 1800° F. for 24 hours _____ 0.6%.

Table 3 which follows, sets forth the optimum ranges for asbestos and wollastonite in xonotlite bodies prepared from slurries having varied water/solids ratios.

TABLE 3

| Water/Solids Ratio | Asbestos [1] | Wollastonite [1] |
|---|---|---|
| 1 | 0 | 35–50 |
| 3 | 10–12 | 4–6 |
| 6 | 15–17 | 3–5 |

[1] Percent by weight of total solids.

The "K-factor" of all of the ware produced in accordance with the method of this invention was in no way adversely affected.

As many widely different embodiments of this invention may be made without departing from the spirit and scope thereof, it is understood that I do not limit myself to the specific embodiments thereof except as defined in the appended claims.

I claim:

1. An integrated high density hydrous calcium silicate body having a crystalline matrix consisting essentially of xonotlite crystals and having 35 to 50 percent by weight of coarse crystalline mineral wollastonite fibers distributed throughout the said body, said wollastonite fibers having a particle size distribution range such that less than about 10 percent by weight of said fibers will pass a 100 mesh screen and said fibers having an average length to thickness of about 8 to 1.

2. An integrated hydrous calcium silicate thermal insulating body having a matrix consisting essentially of integrated xonotlite crystals and having coarse fibers of wollastonite distributed in random arrangement throughout said matrix and constituting between about 3 percent and 50 percent of the weight of said insulating body, said fibers of wollastonite having a particle size distribution such that less than about 10 percent by weight of said fibers will pass a 100 mesh screen and having an average length to thickness ratio of about 8 to 1.

3. An integrated hydrous calcium silicate thermal insulating body having a matrix consisting essentially of integrated xonotlite crystals and a mixture of coarse fibers of wollastonite and asbestos distributed in random arrangement throughout said matrix, said wollastonite fibers being present in an amount constituting at least about 3 percent but not exceeding about 50 percent of the weight of said insulating body and said asbestos fibers being present in an amount not exceeding 17 percent of the weight of said insulating body, said fibers of wollastonite having a particle size distribution such that less than about 10 percent by weight of said fibers will pass a 100 mesh screen and having an average length to thickness ratio of about 8 to 1.

4. An integrated hydrous calcium silicate thermal insulating body having a crystalline matrix consisting essentially of tobermorite and having asbestos and coarse crystalline mineral wollastonite fibers distributed throughout said thermal insulating body, said wollastonite fibers constituting between about 3 percent by weight of said thermal insulating body and together with said asbestos fibers an amount not exceeding about 20 percent by weight of said thermal insulating body, said wollastonite fibers having a particle size distribution such that less than about 10 percent by weight of said particles will pass a 100 mesh screen and having an average length to thickness of about 8 to 1.

5. An integrated hydrous calcium silicate thermal insulating body having a crystalline matrix consisting essentially of xonotlite and having asbestos and coarse crystalline mineral wollastonite fibers distributed throughout said thermal insulating body, said wollastonite fibers constituting between about 3 percent by weight of said thermal insulating body and together with said asbestos fibers an amount not exceeding about 20 percent by weight of said thermal insulating body, said wollastonite fibers having a particle size distribution such that less than about 10 percent by weight of said particles will pass a 100 mesh screen and having an average length to thickness of about 8 to 1.

6. An integrated thermal insulating body consisting essentially of a microporous matrix of synthetic crystalline tobermorite having fibers of asbestos and fibers of wollastonite distributed in random arrangement throughout said insulating body, said fibers of wollastonite constituting between about 3 percent and together with said fibers of asbestos an amount not exceeding about 20 percent by weight of said insulating body, said fibers of wollastonite having a particle size distribution such that less than about 10 percent by weight of said fibers will pass a 100 mesh screen and having an average length to thickness ratio of about 8 to 1.

7. In a method of forming a hydrous synthetic silicate insulating body having reinforcing fibers distributed throughout an integrated crystalline matrix consisting essentially of crystals of xonotlite, the improvement which comprises distributing coarse crystalline mineral wollastonite fibers throughout said insulating body in random arrangement in amounts ranging between about 3 percent to 50 percent by weight of said insulating body during the formation thereof, said mineral wollastonite fibers having a particle size distribution such that less than about 10 percent by weight of said fibers will pass a 100 mesh screen, and having an average length to thickness ratio of about 8 to 1.

8. The method according to claim 7, including the improvement in said distributing step wherein said wollastonite fibers are distributed throughout said insulating body in an amount constituting at least about 35 percent by weight of said insulating body.

9. In a method of forming a hydrous synthetic silicate insulating body having reinforcing fibers distributed throughout an integrated crystalline matrix consisting essentially of hydrous synthetic silicate crystals chosen from the group consisting essentially of tobermorite crystals, xonotlite crystals, and mixtures of tobermorite and xonotlite crystals, the improvement which comprises distributing asbestos fibers and coarse crystalline mineral wollastonite fibers throughout said insulating body in random arrangement in amounts such that the total amounts of said asbestos fibers and wollastonite fibers do not exceed about 20 percent by weight of said insulating body and such that said wollastonite fibers constitute at least about 3 percent by weight of said insulating body during the formation thereof, said mineral wollastonite fibers having a particle size distribution such that less than about 10 percent by weight of said fibers will pass a 100 mesh screen, and having an average length to thickness ratio of about 8 to 1.

10. The method according to claim 9, wherein said matrix consists essentially of crystals of xonotlite.

11. The method according to claim 9, wherein said matrix consists essentially of crystals of tobermorite.

References Cited in the file of this patent

UNITED STATES PATENTS

| | | |
|---|---|---|
| 2,547,127 | Kalousek | Apr. 3, 1951 |
| 2,665,996 | Kalousek | Jan. 12, 1954 |
| 2,748,008 | Kalousek | May 29, 1956 |
| 2,754,547 | Allen | July 17, 1956 |
| 2,787,345 | Soubier | Apr. 2, 1957 |
| 2,838,806 | Sabine | June 17, 1958 |
| 2,888,377 | Allen | May 26, 1959 |
| 2,915,409 | Taylor | Dec. 1, 1959 |
| 3,001,882 | Taylor | Sept. 26, 1961 |